(No Model.)
G. W. TUCKER.
COMBINED STALK CUTTER, ROLLER, AND SEED PLANTER.
No. 514,522. Patented Feb. 13, 1894.
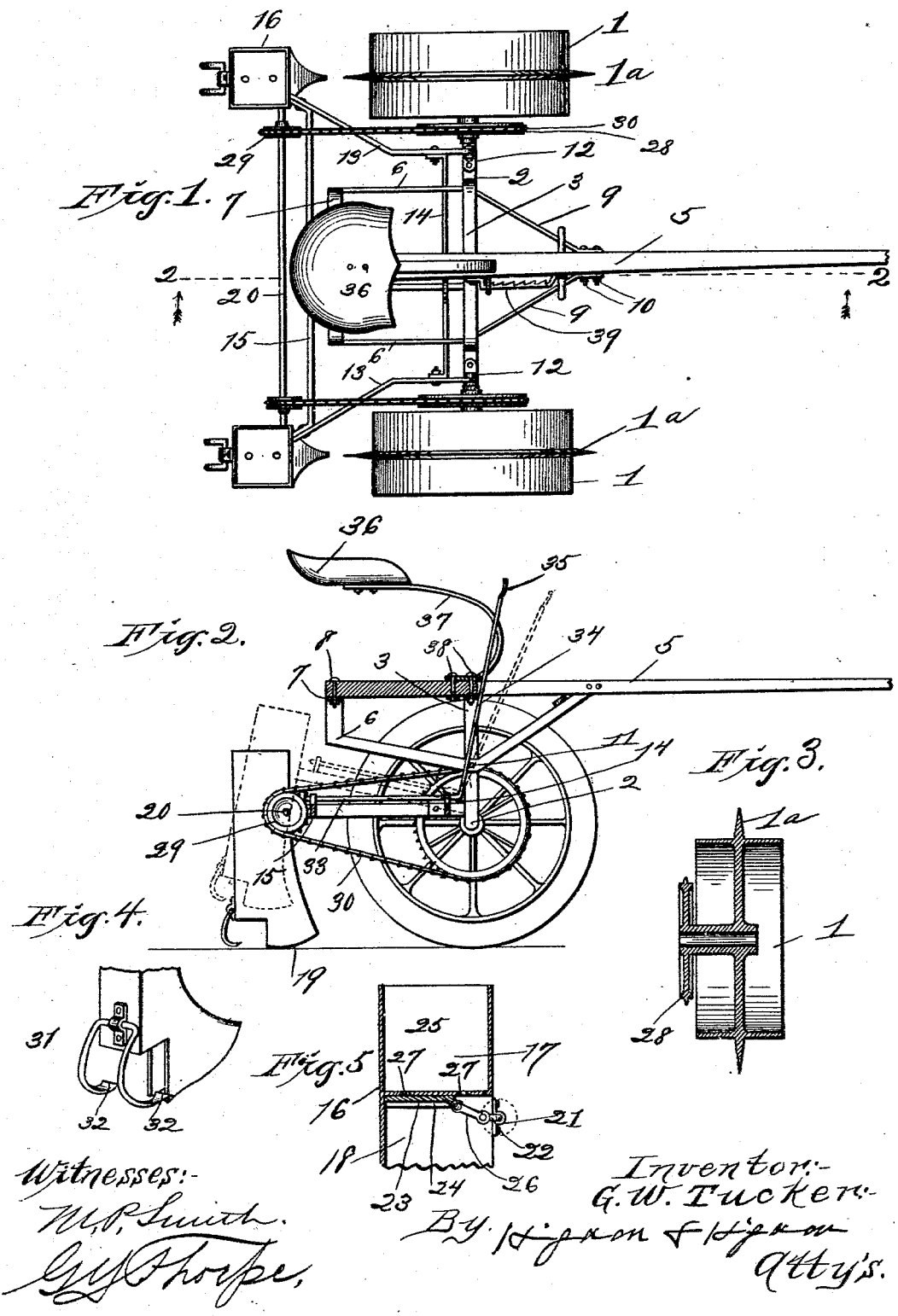

UNITED STATES PATENT OFFICE.

GEORGE W. TUCKER, OF MOBERLY, MISSOURI.

COMBINED STALK-CUTTER, ROLLER, AND SEED-PLANTER.

SPECIFICATION forming part of Letters Patent No. 514,522, dated February 13, 1894.

Application filed May 18, 1893. Serial No. 474,636. (No model.)

*To all whom it may concern:*

Be it known that I, GEORGE W. TUCKER, of Moberly, Randolph county, Missouri, have invented certain new and useful Improvements in a Combined Stalk-Cutter, Roller, and Seed-Planter, of which the following is a full, clear, and exact description, reference being had to the accompanying drawings, forming a part hereof.
My invention relates to improvements in combined stalk-cutters, rollers and seed planters; and the object of my invention is to provide a machine of this character which will effectively do the work required.
A further object of my invention is to provide a machine, in which, by the operation of a lever the corn planting portion of the apparatus may be raised from the ground, so as to avoid stumps of trees, stones, and other irregularities in the surface of the ground which would tend to injure the working parts of the machine, and furthermore to produce a machine of this character which is simple, strong, durable and comparatively inexpensive of construction.

To the above purposes, my invention consists in certain peculiar and novel features of construction and arrangement as will be hereinafter described and pointed out in the claims.

In order that my invention may be fully understood, I will proceed to describe it with reference to the accompanying drawings, in which—
Figure 1, represents a plan view of the machine constructed in accordance with my invention. Fig. 2, represents a vertical sectional view taken on the line 2—2 of Fig. 1. Fig. 3, represents a vertical sectional view of one of the wheels, adapted to furrow the ground for the reception of the corn. Fig. 4, is a detail perspective view of the lower or discharge end of the seed-receptacles, and showing carried thereby the clod crusher, and cover. Fig. 5, is a vertical section of a portion of one of said feed receptacles and showing the sliding plate by which said seed is allowed to drop into the furrow from the seed-receptacle.
In the drawings, 1 designates the wheels of the machine which are journaled to revolve upon opposite ends of the axle 2, said axle being bent upwardly at its center to form the U-shaped extension 3. Each of the drive wheels 1 is provided with an annular and V-shaped projection $1^a$, for the purpose of forming a furrow in the ground, for the reception of the seed from the receptacle, as hereinafter referred to.

Secured upon the upper side of the U-shaped extension 3 of the axle 2 and longitudinally and centrally of the machine is a tongue 5; said tongue being further braced by a bracket composed of side arms 6 joined together at their rear ends by a horizontal cross bar 7, which is secured by bolts 8 to the under side of the rear end of the tongue, and said arms 6 are formed at their front ends, with the inwardly converging extensions 9 which are bolted or otherwise suitably secured at 10, to opposite sides of the tongue 5, and are also bolted at 11, to the inner sides of the U-shaped extensions 3 of the shaft.

Pivotally mounted between ears or brackets 12, bolted or otherwise suitably secured upon the upper side of the axle, are the forward ends of a pivotal frame-work, comprising the side arms 13, joined together near their forward ends and rear ends by the transversely extending bars 14 and 15. The rear ends of said arms 13 carry seed receptacles 16 at their outer ends; these seed receptacles being formed with a hopper 17 in their upper ends, and with a depending guide-extension 18; said extension 18 being composed of side walls which extend downwardly and have their curved lower edges 19 adapted to rest upon the ground, in their normal position, and have their rear walls extending downward to within a suitable distance of the ground, the object of which will be hereinafter explained.

Extending transversely of the machine is a shaft 20, which is journaled at its opposite ends in bearings 21 near the upper ends and front edges of the side walls of the extension 18 of the seed receptacles; said shaft being also formed with the crank sections 22 near each end, one crank section being adapted to operate between the side walls of each extension. A sliding plate 23, is guided by retaining strips or flanges 24 secured to the under side of the bottom 25, of the hopper portion of each seed receptacles, and is pivotally connected by a link bar 26, with the adjacent crank section 22 of the shaft 20. The bottom plate 25 of the hopper portion of the said receptacles, is formed at a suitable distance apart with holes or openings 27, and the plate 23 in its reciprocation, as hereinafter explained, allows the seed to drop through said openings, and is of sufficient length, when at rest to close both of said openings and prevent any seed from escaping from the hoppers.

Formed integral or secured to revolve with each of the drive wheels 1, is a sprocket wheel 28, and keyed or otherwise rigidly secured upon the shaft 20 in longitudinal alignment with the sprocket-wheels 28, are the sprocket pinions 29; the sprocket wheels 28 and sprocket pinions 29 being connected by endless sprocket chains 30. It will thus be seen, that the operation of the sprocket wheel 28 will cause through the medium of the sprocket chain 30 and sprocket pinion 29, the revolution of the crank shaft 20, which will in turn cause the slidable or reciprocating operation of the plates 23, and alternately open the holes in the bottom of the hoppers, so that the seed may pass or drop therethrough.

Secured to the rear wall of the extensions 18 and near their lower end is a clod crusher or breaker 31 which is preferably (in rear view) of approximately U-shape, and has its forwardly extending and free ends sharpened or pointed at 32 as shown, and occupying the space immediately in rear of the ends of the side walls of the extension 18, and beneath the lower end of the rear wall of said extension; the said sharpened ends 32, and also the ends of the side walls of said extension, being adapted to move on opposite sides of the furrow as hereinafter referred to.

In order that the seed receptacles and clod crushers or breakers, may be raised from the surface of the ground to clear stumps of trees, stones and other irregularities in the surface of the ground which would tend to injure such parts of the machine, an approximately L-shaped lever is provided, said lever having its lower and horizontal arm 33, secured at its rear end to the cross-bar 15 of the pivotal frame-work, and being secured near its front end in the cross bar 14, and the upwardly extending arm 34 which lies closely adjacent to the side of the tongue 5 of the machine, and is provided with a foot or hand plate 35 upon its upper end, convenient to the driver, who occupies the seat 36, secured upon the spring support 37, which is secured at its lower end by bolts 38 upon the upper side of the tongue just above the U-shaped extension 3 of the axle. It will be seen from this description, that the driver by pressing his foot or hand against the plate 35 causes the frame, pivotally mounted between the ears 12 above the axle, to be elevated as shown in dotted lines Fig. 2, and to retain said pivotal frame in such elevated position, a rack bar 39 is provided, against the teeth of which the spring arm 34 of the L-shaped lever is adapted to rest; said rack bar being bolted at its opposite ends or otherwise suitably secured to the side of the tongue.

In the operation of the device, as the machine is pulled over the ground the V-shaped and annular projection $1^a$ of each wheel forms a furrow, and upon opposite sides of these furrows, the side walls of the extension 18 of the seed receptacles are adapted to travel. As the machine is pulled over the ground, the revoluble movement of the furrow making or drive wheels 1 causes through the medium of the sprocket wheel 28, sprocket chain 30 and sprocket wheel 29, the revolution of the crank shaft 22, and therefore the reciprocation of the slidable plate 28 as hereinbefore referred to. This operation allows the seed to drop alternately and therefore at equal distances apart from the hoppers 17 between the side walls of the extension 18 and into the furrow, and the trailing spring arms of the clod-crusher attachment, force the earth upon each side of the furrow to cover the seed dropped, and also will break or crush any clods or hard lumps of dirt with which they come in contact. By the operation of the lever any rocks or such obstacles may be passed by the lifting of the hoppers and clod crushers or breakers a suitable height from the ground.

From the above description, it will be seen that I have produced a combined stalk cutter, roller and seed planter, which is simple, strong, durable and inexpensive of construction, which is positive and reliable in action, and by which ordinary obstacles such as stones, short tree stumps, and such objects may be passed without endangering the working parts of the machine.

Having thus described my invention, what I claim as new, and desire to secure by Letters Patent, is—

1. In a combined roller, stalk cutter and seed planter, the combination with an axle and wheels provided with an annular and projecting flange upon their peripheries, and revolubly mounted upon the ends of said axle, and a sprocket wheel carried by one of said wheels, a pivotal frame, a pair of seed receptacles carried by said pivotal frame and a crank shaft journaled at its opposite ends to the front side of said seed receptacles, hoppers formed in the upper end of said seed receptacles having openings formed through their bottom, and a slidable plate supported against the bottom of each hopper and connected by pivotal links with the crank sections of the crank shaft, a sprocket pinion carried by said shaft and a sprocket chain connecting said sprocket pinion and the sprocket wheel carried by the furrowing drive wheel, substantially as set forth.

2. In a combined stalk-cutter, seed-planter and roller, the combination with a wheeled frame, and a frame pivoted to the axle thereof and carrying the seed dropping mechanism, and consisting of side bars 13, and front and rear cross-bars 14 and 15 connecting the side bars, and a tongue carried by the wheeled frame, of a rack-bar 39 carried by the tongue, and an L shaped lever, consisting of the arm 33 secured to the bars 14 and 15 and the arm 34 which is adapted to be engaged with the rack-bar, substantially as set forth.

In testimony whereof I affix my signature in the presence of two witnesses.

GEORGE W. TUCKER.

Witnesses:
W. MAYNARD,
A. P. CROSBY.